United States Patent [19]
Bergan

[11] 4,106,088
[45] Aug. 8, 1978

[54] CURRENT DRIVE CIRCUITS

[75] Inventor: Kenneth N. Bergan, Minnetonka, Minn.

[73] Assignee: Control Data Corporation, Minneapolis, Minn.

[21] Appl. No.: 833,534

[22] Filed: Sep. 15, 1977

[51] Int. Cl.² .......................................... H02M 7/00
[52] U.S. Cl. .................................. 363/132; 363/40; 363/136; 365/6
[58] Field of Search .................... 307/263; 363/16, 17, 363/20, 21, 27, 30, 39, 40, 123, 124, 131, 132, 135–138; 365/6; 333/29, 79, 20

[56] References Cited

U.S. PATENT DOCUMENTS

| | | | |
|---|---|---|---|
| 3,316,476 | 4/1967 | Olson et al. | 363/135 X |
| 3,406,327 | 10/1968 | Mapham et al. | 363/135 |
| 3,932,798 | 1/1976 | Chalmers et al. | 363/138 |
| 3,972,036 | 7/1976 | Navratil | 365/6 |
| 3,972,037 | 7/1976 | Hess, Jr. et al. | 365/6 |

Primary Examiner—William M. Shoop
Attorney, Agent, or Firm—Robert M. Angus

[57] ABSTRACT

A current drive circuit for deriving a triangular current waveform for driving an inductive load, such as the field coils of a bubble memory, comprises a series of at least four diodes connected between the positive and negative input voltage lines. A pair of switching devices, such as switching transistors, are connected in series such that each switching device is in parallel with two of the diodes. The junction between the switching devices is also connected to one output for the inductive load. The intermediate diodes are connected together and to one side of a time delay circuit, the opposite side of which is connected to the second output for the opposite side of the inductive load. A modification of the invention comprises a second diode and switching circuit connected between the time delay circuit and the second output.

4 Claims, 6 Drawing Figures

CURRENT DRIVE CIRCUITS

This invention relates to current drive circuits, and particularly to current drive circuits for deriving a triangular current waveform for driving inductive loads, such as the field coils of a bubble memory.

Certain memory systems for computers, such as the class of memories known as "bubble" memories, require field coils for both the X and Y orientations of the memory. The field coils are driven by currents, and it is known that triangular waveform current for a field coil for a bubble memory is highly adaptable to a digital drive, thereby making the memory more adaptable to digital computers. Current drive circuits are well known for deriving currents with triangular waveforms and ordinarily include switching transistors connected to positive and negative dc voltage lines for driving the inductive load. However, transistor switches do not open and close instantaneously. Therefore, upon closing (making conductive) a transistor switch, a voltage drop is created across the switch thereby causing power dissipation and power loss through the switch. The present invention is concerned with the inclusion of a holding circuit comprising a capacitive time delay and diode protective circuit whereby the drive circuit operates on the fall time of the transistor only, not the rise time, thereby making the circuit more efficient and reducing power losses.

In accordance with the present invention, a pair of diodes is connected across each of two switching transistors, the junction between the diode pairs being connected to one output for the inductive load. The intermediate diodes are connected together and to one side of a time delay circuit which preferably includes a capacitor, the opposite side of which is connected to the opposite side of the inductive load.

In accordance with a modification of the present invention, a second diode and switching circuit is connected between the second output for the inductive load and the second side of the time delay circuit.

One feature of the present invention resides in the provision of the diodes forming a protective overload circuit for the current drive circuit so that the voltage across the inductor cannot exceed the line voltage provided by the dc input.

Another feature of the present invention resides in the provision of the capacitor in the time delay circuit to store a voltage equivalent to the line voltage in anticipation of the operation of the next switch so that upon operation of the transistor switch to a conducting mode, the voltage across the inductor is already at the line voltage provided by that transistor switch. This feature provides the advantage of not creating a voltage drop across the switch, thereby minimizing power losses.

Another feature of the present invention resides in the fact that the time delay circuit formed by the inductive load and capacitor serve to delay the rise and fall times of the voltage waveform across the inductive load, thereby reducing the noise associated with the reversal of potential polarities and reducing power dissipation in the switches.

The above and other features of this invention will be more fully understood from the following detailed description and the accompanying drawings, in which:

FIGS. 1A and 1B, taken together, illustrated the principles of operation of the current drive circuit in accordance with the present invention;

Figure 1A:
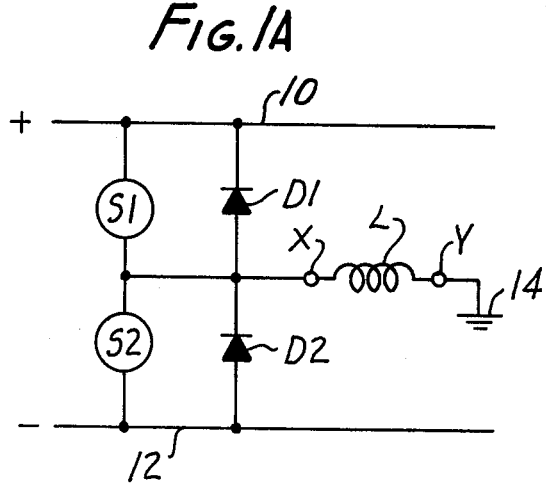
Figure 1B:
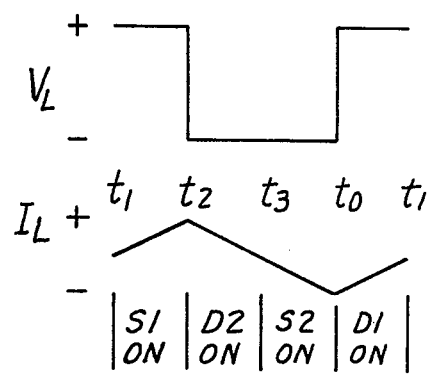

With reference to the drawings, there is illustrated in FIG. 1A, a circuit diagram of a current drive circuit for deriving a triangular current waveform for driving an inductive load. Conductors 10 and 12 are, respectively, connected to positive and negative sources of voltage. Switch S1 is connected between conductor 10 and one output X connected to the inductive load L. Switch S2 is connected between output X and conductor 12. Diode D1 has its cathode connected to conductor 10 and its anode connected to the output X, whereas diode D2 has its anode connected to conductor 12 and its cathode connected to the output X. A second output X for inductive load L is connected directly to ground as illustrated at 14.

With switch S1 closed (or made conducting), a high positive voltage is applied through switch S1 to output terminal X, thereby increasing the current through inductive load L positively. At time $t_2$, switch S1 is opened (nonconductive), thereby decreasing the current through the inductive load L. The voltage, $V_L$, across the load may be represented by:

$$V_L = L\ (dt/di)$$

Since $(dt/di)$ is decreasing, $V_L$ is driven sharply negative. Diode D2 conducts thereby maintaining the voltage at output terminal X at the negative voltage regulated by conductor 12. At time $t_3$, when the current reaches approximately zero value, switch S2 is closed (or made conductive) thereby imposing a negative voltage from conductor 12 onto terminal X for the inductive load so the current through the inductive load continues its negative swing. When the switch S2 is opened (made nonconductive), at $t_0$, the negative current through inductive load L decreases toward the positive, thereby driving the voltage at terminal X highly positive. Diode D1 conducts, thereby maintaining the voltage at terminal X at the voltage established on conductor 10. At time $t_1$, switch S1 is closed (made conducting) to thereby repeat the sequence.

As heretofore explained, it is desirable to delay the rise and fall times of the voltage waveform across the inductive load L to reduce noise associated with a reversal of potential polarities as well as to reduce power dissipation in the switches.

Figure 2A:
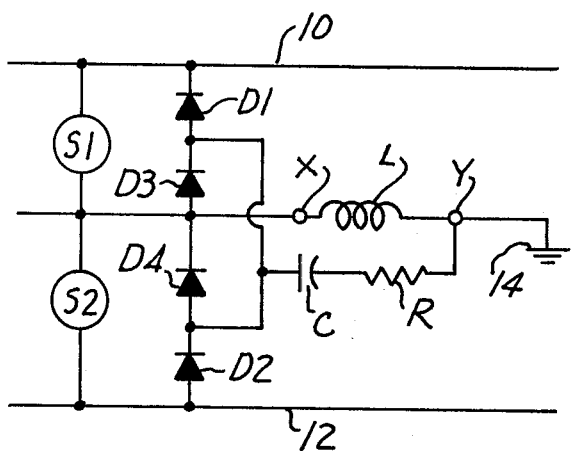
FIG. 2A is a circuit diagram of a current drive circuit in accordance with the presently preferred embodiment of the present invention.
Figure 2B:
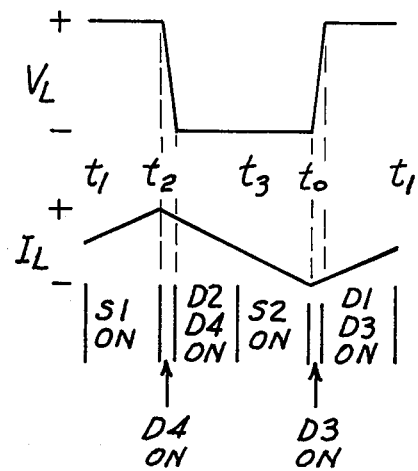
FIG. 2B illustrates voltage and current of waveforms useful in the explanation of the operation of the apparatus illustrated in FIG. 2A.

FIG. 2A illustrates the presently embodiment of the present invention for delaying the rise and fall time of the voltage across the inductive load. As illustrated in FIG. 2A, the anode of diode D1 is connected to the cathode of diode D2, as in the case of FIG. 1A, and that junction is also connected to the series connection of capacitor C and resistor R, which forms a time delay circuit. Output terminal Y is connected to the opposite side of inductive load L and to the opposite side of the time delay circuit. Diode D3 has its cathode connected to the anode of diode D1 and its anode connected to output terminal X, whereas diode D4 has its anode connected to the cathode of diode D2 and its cathode connected to output terminal X.

In the operation of the apparatus illustrated in FIG. 2A, assume that the charge on capacitor C is positive so that at time $t_1$ switch S1 is closed or made conductive and a positive voltage is applied from conductor 10 to terminal X for inductive load L as well as for capacitor C. Also, the current passing through inductive load L increases positively. At time $t_2$, switch S1 is opened (made nonconductive) thereby permitting the current through inductive load L to decrease. Thus, the voltage $V_L$ across the inductive load tries to swing sharply negative, but the charge on capacitor C discharges through the load thereby causing $V_L$ to decay at a rate dependent upon the time constant established by the RLC time delay. When capacitor C has fully reversed its charge and the voltage at point X has gone fully negative, diode D2 conducts thereby maintaining and regulating the voltage at point X at the negative potential supplied by conductor 12. Also, capacitor C is charged to the full negative voltage. At time $t_3$, when the current through inductive load L reaches O, switch S2 is closed (or made conductive) to increase the current negatively through inductive load L. At time $t_0$, switch S2 is opened (made nonconductive) and the negative charge on capacitor C biases diode D3 to conduction so that the voltage at output X decays positively until full positive voltage appears at output terminal X and the charge on capacitor C has reversed to full positive potential. When the voltage at point X reaches full positive, diode D1 conducts to thereby regulate the voltage at terminal X to that on conductor 10. Also the current through conductor L begins decaying positively from a full negative current towards 0. The process is hence ready to begin a second cycle.

It will be appreciated from the foregoing that when switches S1 and S2 are made conductive, the voltage appearing at output terminal X is already regulated to the voltage on line 10 or 12 and is established by the charge on capacitor C. Hence, there is no voltage drop across switch S1 or S2 when made conductive. As a result, there is no power dissipation in the transistors during the rise time of the transistors.

Figure 3A:
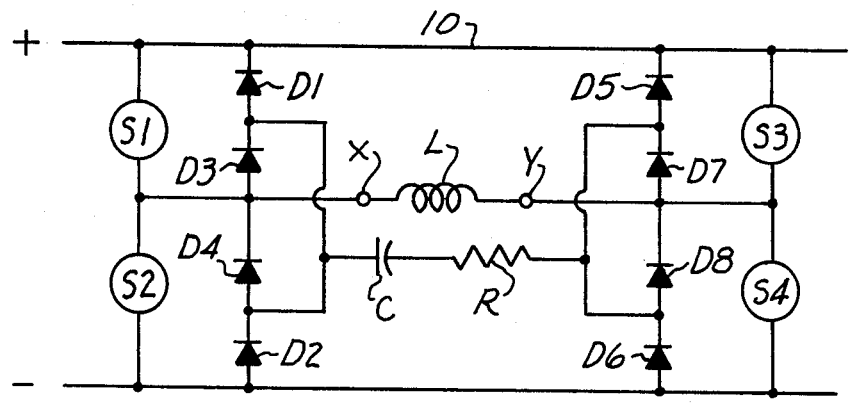
FIG. 3A is a circuit diagram of a current drive circuit in accordance with a modification of the present invention.

With reference to FIG. 3A, there is illustrated a current drive circuit in accordance with a modification of the present invention. The circuit illustrated in FIG. 3A is essentially the same as that illustrated in FIG. 2A, except that a second diode/switch circuit is provided between the time delay circuit and terminal Y. Thus, switch S3 is connected between terminal Y and conductor 10, switch S4 is connected between terminal Y and conductor 12, the cathode of diode D5 is connected to conductor 10, the anode of diode D5 is connected to the cathode of diode D6 and the anode of diode D6 is connected to conductor 12. Also, the junction between diodes D5 and D6 is connected to the opposite side of time delay circuit represented by capacitor C and resistor R. Diode D7 has its anode connected to terminal Y and its cathode connected to the anode of diode D5 and diode D8 has its anode connected to the cathode of diode D6 and its cathode connected to terminal Y.

Figure 3B:
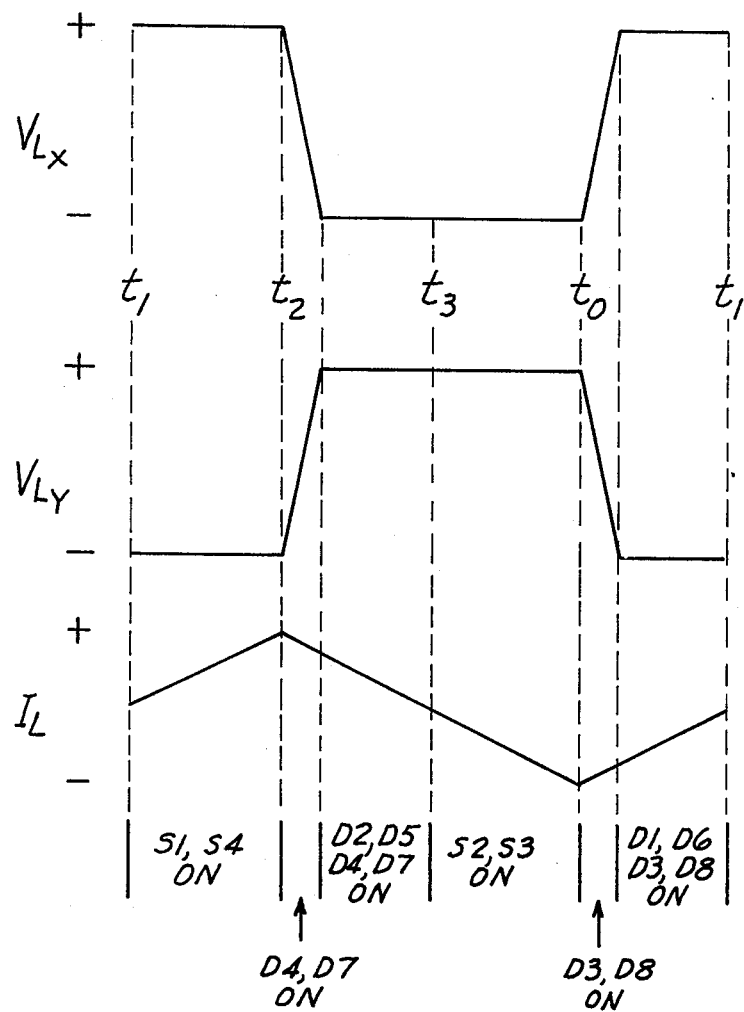
FIG. 3B illustrates voltage and current waveforms useful in the explanation of the operation of the apparatus illustrated in FIG. 3A.

With reference to FIG. 3B, the voltage waveforms at terminals X and Y are illustrated (with respect to ground) and the current through the inductive load is illustrated. Thus, at time $t_1$, and assuming the charge on capacitor C is positive, switches S1 and S4 are made conductive so that the voltage at terminal X is highly positive and the voltage at terminal Y is highly negative. Thus, the current through inductive load L is increasing positively. At time $t_2$, switches S1 and S4 are opened (made nonconductive) and the positive current through inductive load L begins decreasing. Diodes D4 and D7 conduct so that capacitor C discharges to a full negative charge to delay the full reversal of voltage at terminals X and Y. When the voltage at terminal X is at a full negative voltage and terminal Y is at full positive voltage, diodes D2 and D5 conduct to maintain the negative voltage on terminal X and the positive voltage on terminal Y and to decrease the positive current through load L. At time $t_3$, switches S2 and S3 are closed (made conductive) to maintain the voltage waveforms as illustrated in FIG. 3B and to increase negatively the current through the inductive load. At time $t_0$, switches S2 and S3 are opened (made nonconductive) and diodes D3 and D8 conduct to permit capacitor C to discharge to decay the voltages appearing at terminals X and Y until they are fully reversed and to reverse the charge on capacitor C. At the same time, the negative current through inductive load L decreases (toward positive). When the voltages at terminals X and Y are fully reversed, diodes D1 and D6 conduct to maintain those voltages at the line voltages proposed by conductors 10 and 12 so the current continues to decrease toward the positive. The process is then ready to commence another cycle.

The present invention thus provides a delay circuit for delaying the fall time of the switching transistors, together with a capacitor for storing the voltages so that no voltage drops are created across the transistors during the rise times of the switching transistors. The resistor R shown in the drawing may be very small, and in fact, may comprise the resistance of the wire and of the inductor. To illustrate the reduction of power dissipation and the control of voltage fall time provided by the present invention, several current drive circuits according to this invention were constructed to operate at a frequency of 400 KHz with an output current through the inductive load of 4.0 amps driving an inductive load of 7 $\mu$H with a series resistor R having a value of 0.7 ohms. In one case, capacitor C had a value of 0.0077$\mu$F, the supply voltage was 50 volts dc, the current drain was 280 ma, and the input power was 14 watts. In a second case, capacitor C was raised to 0.0152$\mu$F and the supply voltage was increased to 56 volts dc to maintain the 4.0 amp output. In this second case, the drain current was 200 ma and input power was reduced to 11.2 watts. In a third case, capacitor C was raised to 0.0202$\mu$F and the supply voltage was increased to 60 volts to maintain the 4.0 amp output. In this third case, the drain current was 175 ma and the input power was reduced to 10.5 watts. In these three cases, the voltage fall time was 100, 350 and 600 nanoseconds, respectively, with the current waveform progressing from triangular to near sinusoidal.

Thus, the present invention provides a modified triangular current waveform drive circuit useful for driving inductive loads, with controlled voltage fall times and reduced power dissipation for digitally controlled switches, such as transistor switches.

This invention is not to be limited by the embodiment shown in the drawings and described in the description, which are given by way of example and not of limitation, but only in accordance with the appended claims.

What is claimed is:

1. A current drive circuit for an inductive load comprising: first conductor means for connection to a source of positive voltage; second conductor means for connection to a source of negative voltage; first output means for connection to one side of said inductive load; second output means for connection to the opposite side of said inductive load; first switch means connected between said first conductor means and said first output means; second switch means connected between said second conductor means and said first output means; first diode means having its cathode connected to said first conductor means; second diode means having its anode connected to said second conductor means; third diode means having its cathode connected to the anode of said first diode means and having its anode connected to said first output means; fourth diode means having its anode connected to the cathode of said second diode means and having its cathode connected to said first output means; time delay means; first circuit means connecting one side of said time delay means to the junction between said first and third diode means and to the junction between said second and fourth diode means; and second circuit means connecting the opposite side of said time delay means to said second output means.

2. A current drive circuit according to claim 1 wherein said time delay means includes a capacitor and resistor connected in series.

3. A current drive circuit according to claim 1 wherein said second circuit means comprises: third switch means connected between said first conductor means and said second output means; second switch means connected between said second conductor means and said second output means; fifth diode means having its cathode connected to said first conductor means; sixth diode means having its anode connected to said second conductor means; seventh diode means having its cathode connected to the anode of said fifth diode means and having its anode connected to said second output means; eighth diode means having its anode connected to the cathode of said sixth diode means and having its cathode connected to said second output means; and third circuit means connecting said opposite side of said time delay means to the junction between said fifth and seventh diode means and to the junction between said sixth and eighth diode means.

4. A current drive circuit according to claim 3 wherein said time delay means includes a capacitor and a resistor connected in series.

* * * * *